United States Patent
Luttmann et al.

(10) Patent No.: US 9,442,625 B1
(45) Date of Patent: Sep. 13, 2016

(54) VISUAL INDICATION OF A DEVICE CONNECTION SPEED

(76) Inventors: Eric J. Luttmann, Boise, ID (US); Dave Gilbert, Boise, ID (US)

( * ) Notice: Subject to any disclaimer, the term of this patent is extended or adjusted under 35 U.S.C. 154(b) by 1309 days.

(21) Appl. No.: 13/324,952

(22) Filed: Dec. 13, 2011

Related U.S. Application Data

(63) Continuation of application No. 11/872,499, filed on Oct. 15, 2007, now Pat. No. 8,078,973, which is a continuation of application No. 10/180,475, filed on Jun. 25, 2002, now abandoned.

(51) Int. Cl.
*G06F 3/0481* (2013.01)

(52) U.S. Cl.
CPC ................ *G06F 3/04817* (2013.01)

(58) Field of Classification Search
CPC .................................. G06F 3/04817
See application file for complete search history.

(56) References Cited

U.S. PATENT DOCUMENTS

| | | |
|---|---|---|
| 5,959,621 A | 9/1999 | Nawaz et al. |
| 6,366,297 B1 | 4/2002 | Feagans |
| 6,437,800 B1 | 8/2002 | Malamud et al. |
| 6,473,797 B1 | 10/2002 | Hirasawa |
| 6,606,101 B1 | 8/2003 | Malamud et al. |
| 6,728,219 B1 | 4/2004 | Leong et al. |
| 6,738,809 B1 | 5/2004 | Brisebois et al. |
| 6,826,639 B2 | 11/2004 | Pasumansky et al. |
| 6,832,271 B1 | 12/2004 | Ivan et al. |
| 2001/0023438 A1 | 9/2001 | Ishida |

OTHER PUBLICATIONS

Iomega, "Iomega—Zip," Aug. 1, 2001, Available https://web.archive.org/web/20010801154503/http://www.iomega.com/zip/products/usb100.html.*
Iomega, "Iomega.com : Support : Zip 100 USB Home," Aug. 1, 2001, Available https://web.archive.org/web/20010801153342/http://www.iomega.com/support/zip1u.html.*
Iomega, "Iomega.com : Support : Zip 100 USB : Tutorials," Aug. 2, 2001, Available https://web.archive.org/web/20010802100943/http://www.iomega.com/support/zip1u_tut.html.*
Iomega, "Iomega : support Document # 11049.html," Jun. 25, 2001, Available https://web.archive.org/web/20010804162219/http://www.iomega.com/support/documents/11049.html.*
Mark Sweeney, "NetPerSec," Jan. 16, 2001, PC Magazine, v20n02, http://www.pcmag.com/print_article2/0,2533, a=4691,00 asp.
USPTO Advisory Action for U.S. Appl. No. 10/180,475 dated Sep. 30, 2005; 3 pages.
USPTO Advisory Action for U.S. Appl. No. 11/872,499 dated Dec. 2, 2010; 3 pages.
USPTO Final Rejection for U.S. Appl. No. 10/180,475 dated Aug. 10, 2005; 15 pages.
USPTO Final Rejection for U.S. Appl. No. 11/872,499 dated Sep. 13, 2010; 15 pages.
USPTO Non-Final Rejection for U.S. Appl. No. 11/872,499 dated Aug. 19, 2009; 16 pages.
USPTO Non-Final Rejection for U.S. Appl. No. 10/18,475 dated Apr. 4, 2005: 15 pages.

(Continued)

*Primary Examiner* — Alvin Tan
(74) *Attorney, Agent, or Firm* — Lowenstein Sandler LLP

(57) ABSTRACT

A method of providing visual indication of a device connection speed proceeds by determining a connection speed of the device and selecting a visual indicator representative of the connection speed. Once the appropriate indicator has been selected, the visual indicator is then displayed.

16 Claims, 3 Drawing Sheets

(56) References Cited

OTHER PUBLICATIONS

USPTO Non-Final Rejection for U.S. Appl. No. 11/872,499 dated Feb. 16, 2011; 15 pages.

USPTO Non-Final Rejection for U.S. Appl. No. 11/872.499 dated Apr. 1, 2010; 14 pages.

USPTO Notice of Allowance for U.S. Appl. No. 11/872,499 dated Aug. 4, 2011; 9 pages.

* cited by examiner

VISUAL INDICATION OF A DEVICE CONNECTION SPEED

CROSS REFERENCE RELATED APPLICATIONS

This application is a continuation of U.S. application Ser. No. 11/872,499, filed Oct. 15, 2007, which is a continuation of U.S. application Ser. No. 10/180,475, filed Jun. 25, 2002, which are both incorporated by reference.

TECHNICAL FIELD

The present invention relates to a method of informing a user regarding a speed of a connection between a device and a host. More particularly, this invention relates to a method of visually displaying an indicator representing the connection speed of the device.

BACKGROUND

When a USB device (such as a Mass Storage device) is plugged into a USB bus of a host computer, the host operating system (OS) enumerates the device and mounts it to a desktop of the OS. Each mounted device conventionally has a graphic icon associated with it that can be displayed on the desktop, such as in a desktop window. A display screen (such as a computer monitor) connected to the host computer displays the desktop to a user. Traditionally, it has been difficult (or impossible) for a user to determine what bus speed the USB device was enumerated at (e.g., low speed (LS), full speed (FS), or high speed (HS)). The differences in throughput between LS (1.5 Mbit/sec), FS (12 Mbit/sec), and HS (480 Mbit/sec) is significant.

FIG. 1 is a schematic illustration of a desktop window representing connected devices in a conventional manner. Referring to FIG. 1, a first icon 12 in an operating system desktop window 10 represents a removable disk drive. A second icon 14 represents a local hard drive. A third icon 16 represents a USB connected mass storage device. As shown in FIG. 1, when a USB device (such as a mass storage device) is enumerated in a traditional system, a graphic icon 16 representing the device is displayed on the desktop. The graphic icon is selected based solely on the type of device (e.g., a local drive, a removable drive, a CD-ROM drive, etc.). There has traditionally been no easy way to identify the speed at which a device has been enumerated.

SUMMARY OF THE INVENTION

According to one embodiment of the present invention, a method of providing visual indication of a device connection speed is provided. According to this method, a connection speed of the device is determined and a visual indicator representative of the connection speed is selected. Once the appropriate indicator has been selected, it is then displayed. In addition to representing the speed of connection, the visual indicator can also be selected to represent the type of device connected.

According to another aspect of the invention, a system can be configured to visually represent a device connection speed. The system preferably includes a host and a peripheral device connected to the host. Microprocessor(s) can be programmed to provide means for determining a connection speed of the peripheral device and means for selecting a visual indicator corresponding to the connection speed. A display unit can be configured to display the selected visual indicator.

In a preferred embodiment, a device is connected to a host computer via a USB connection. A visual indicator, preferably comprising a graphic icon that represents the speed of the USB connection, can be selected using software running on the host computer. The selected graphic icon can then be displayed on a display screen of a computer monitor connected to the host computer. The display screen can be configured to display the icon on a desktop, in a desktop window, or in a desktop tray of the host operating system, for example.

BRIEF DESCRIPTION OF THE DRAWINGS

The foregoing and additional aspects and advantages of the present invention will become more readily apparent through the following detailed description of preferred embodiments, made with reference to the attached drawings, in which.

DETAILED DESCRIPTION OF PREFERRED EMBODIMENTS

The principles of the present invention will be described more fully hereinafter with reference to preferred embodiments thereof. It should be noted, however, that these embodiments are provided by way of example, and not by way of limitation, and that the embodiments disclosed herein may be modified in form and detail without departing from the principles and scope of the invention.

According to various preferred embodiments of this invention, a graphic icon displayed for a USB-connected drive or other device is selected based on a speed of a connection (e.g., whether the device is enumerated at low speed (LS), full speed (FS), or high speed (HS)). By implementing the principles of the present invention, a user can determine the speed of the connection simply by glancing at the graphic icon (or other visual indicator) representing the mounted device.

Figure 1:
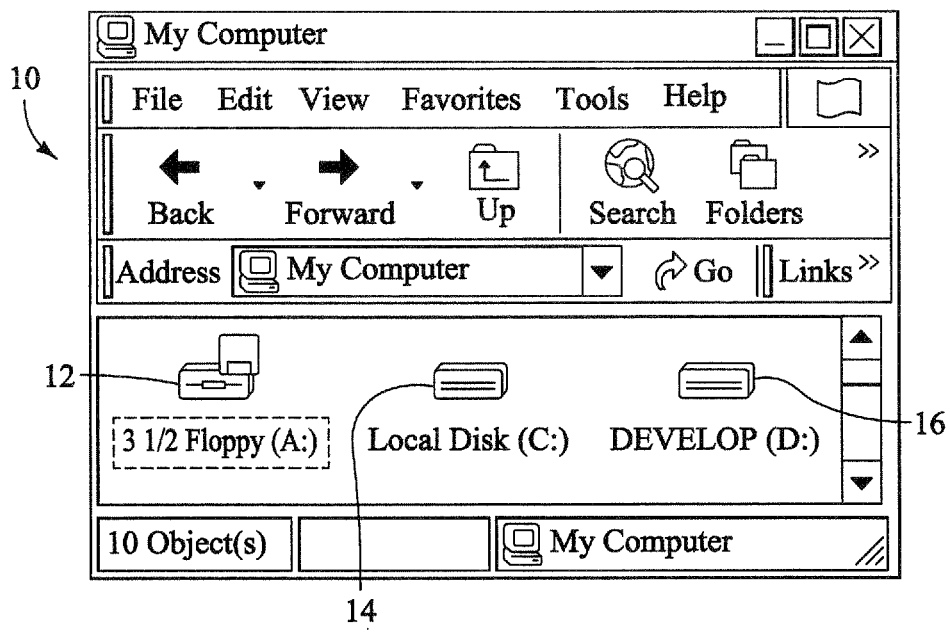
FIG. 1 is a schematic illustration of a desktop window of a computer operating system containing a conventional visual representation of a USB-connected device.
Figure 2:
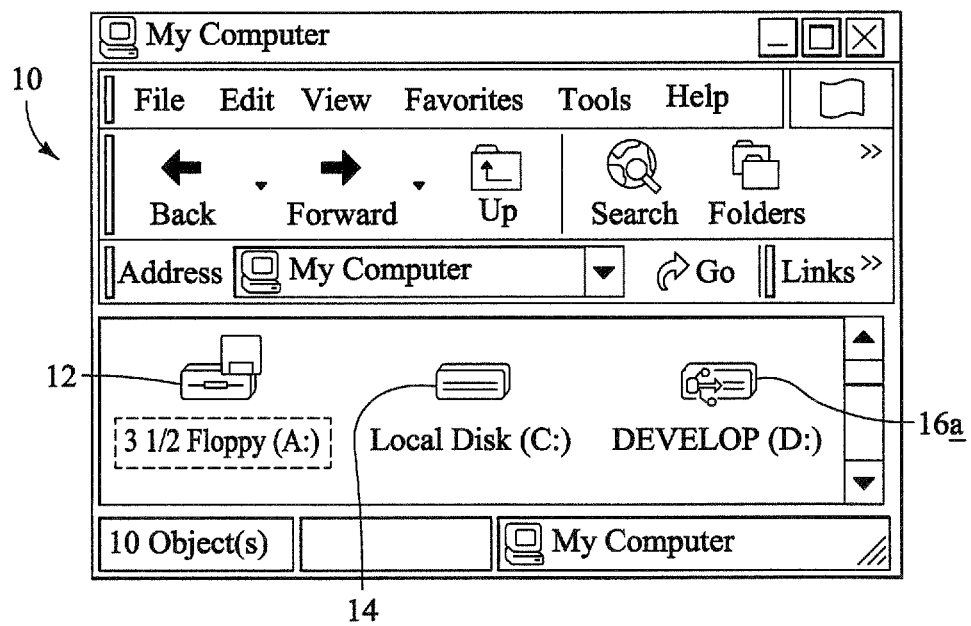
FIG. 2 is a schematic illustration of a desktop window including a visual representation of a connection speed of a device according to an embodiment of the present invention.
Figure 3:
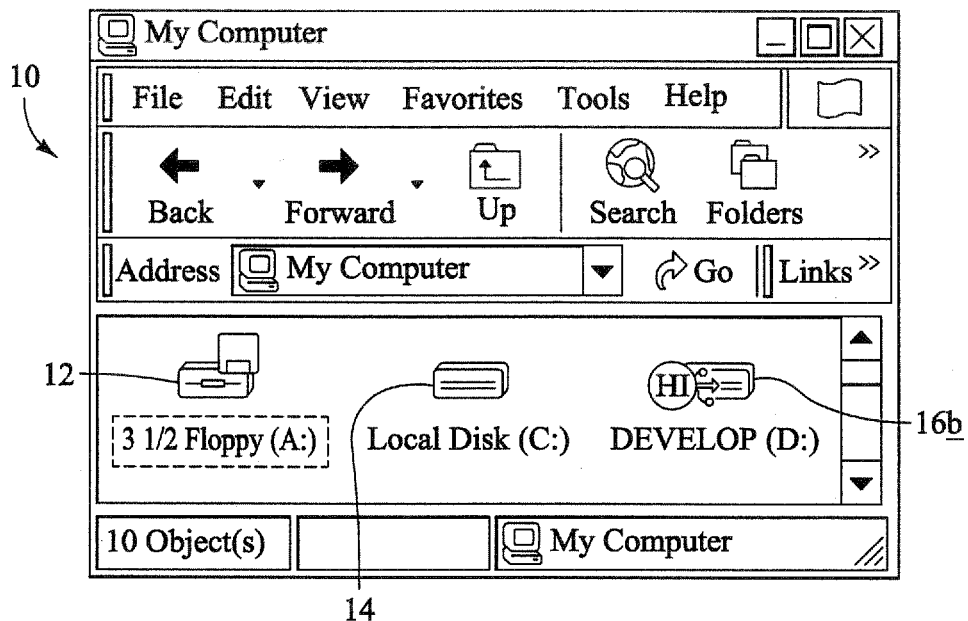
FIG. 3 is a schematic illustration of a desktop window including a visual representation of a high-speed device connection according to another aspect of the invention.

FIG. 2 is a schematic illustration of a host OS desktop window 10 displaying a graphic icon 16a that represents a USB Mass Storage device enumerated at full speed, according to one aspect of the present invention. FIG. 3 shows a desktop window 10 displaying a different graphic icon 16b representing a USB Mass Storage device enumerated at high speed, according to another aspect of the present invention. A still different icon could be used to represent a low speed connection.

Referring to FIGS. 2 and 3, by selecting and displaying a graphic icon 16a, 16b that indicates the connection speed of the connected device, a user will be able to readily determine at what USB bus speed (e.g., LS, FS, or HS) the device can operate. A microprocessor (CPU) of a host computer can be programmed to retrieve information about the speed of connection of the mounted device. Information regarding the speed of connection could be retrieved, for instance, from the device or from the host OS. Once the speed has been determined, the appropriate icon 16a, 16b can then be selected and displayed. The icon 16a, 16b is preferably selected to represent both the connection speed and the type of device enumerated. Once selected, the icon 16a, 16b can then be displayed on a computer screen displaying a desktop or desktop window of the computer OS.

Figure 4:
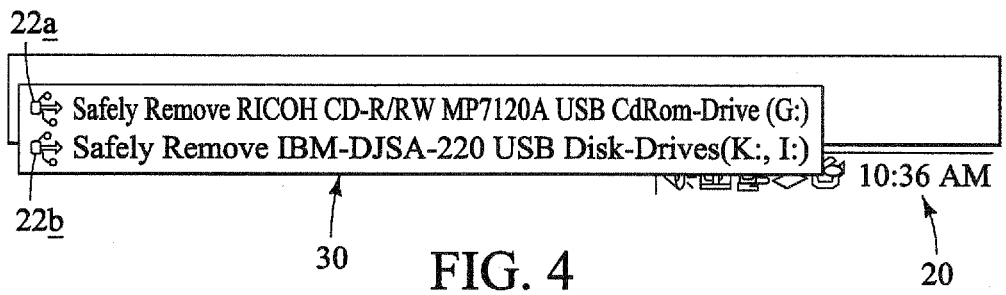
FIG. 4 is a schematic illustration of a desktop tray and pop-up window of a computer operating system including a visual representation of a low-speed device connection and a visual representation of a high-speed device connection according to still further aspects of the present invention.

Of course, other visual display methods are also contemplated. According to another embodiment of the invention, for instance, visual indication of the device connection speed can be provided in a tray icon, either directly in a tray itself or in a pop-up window of the tray. FIG. 4 illustrates one alternative embodiment, in which a tray icon 22a, 22b is used to represent device connection speed. Referring to FIG. 4, a colored icon 22b (color not shown) in a pop-up window 30 of the desktop tray 20 can be used to represent a device enumerated at high speed, whereas a gray icon 22a can be used to represent a device enumerated at full speed. Rather than using color to indicate the speed of connection, different icons could be used, as in the previous embodiment. Other methods of providing visually distinguishable icon features could also be used.

Many other ways of providing a visual representation of device connection speed to a user could also be used. Among other things, the type of icons and the display locations can be varied with respect to a desktop OS display system. The icons themselves can be modified in any desired manner (e.g., size, shape, color, etc.) to represent different connection speeds. Further, although the visual indicator in the preferred embodiment is a graphic icon displayed on a computer monitor or similar display device, other visual indicators such as LEDs or images or symbols on a display panel (e.g., an LCD panel or screen) could also be used to provide visual indication of USB enumerated speed to a user. Instead of a computer monitor that is part of the host computer system, the display unit can be a light or display panel that is part of the USB connection cable or part of the USB device.

In summary, a method of providing visual indication of a device connection speed includes determining a connection speed of a device. A visual indicator representative of the connection speed is then selected and displayed.

Figure 5:
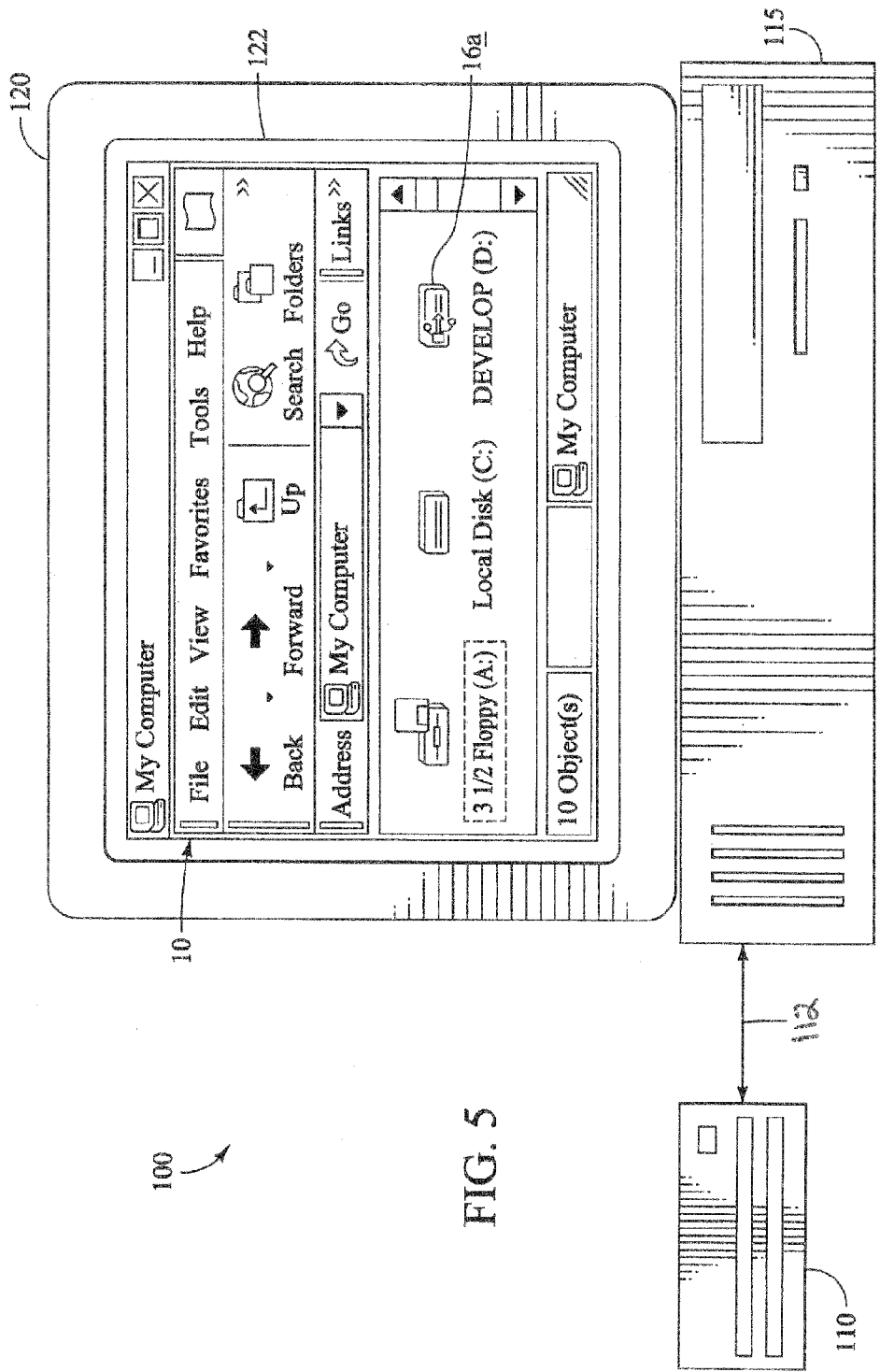
FIG. 5 is a schematic diagram illustrating a system configured to visually represent the speed of a device connection to a user.

FIG. 5 is a schematic diagram illustrating a system 100 configured to visually represent a device connection speed. Referring to FIG. 5, the system preferably includes a USB device 110 connected to a host computer 115 via a USB connection 112. The host computer 115 is connected to a display unit 120, such as a computer monitor, which is configured to visually represent the speed of the device connection to a user. The USB device 110 is enumerated, for example, at either a low, full, or high bus speed.

A visual indicator is selected based on the speed at which the USB device 110 is enumerated. The visual indicator is preferably a graphic icon 16a displayed on a display screen 122 of the display unit 120. The display screen 122 can, for example, display the graphic icon 16a in a desktop window of a host OS. A software program running on the host computer 115 can instruct the host computer 115 to determine the connection speed, select an appropriate graphic icon 16a, and display the icon 16a on the screen 122.

Although the graphic icon 16a of FIG. 5 is shown displayed in a desktop window, the graphic icon could alternatively be displayed directly on a desktop of the host OS, in a tray of the host OS desktop, in a pop-up window of the tray, or in any other desired location. In addition, the visual indicator can be selected to not only represent the speed of connection, but also the type of device connected. As discussed above, other types of display units and visual indicators could also be used.

In summary, a system can be configured to visually represent a device connection speed. The system preferably includes a host, such as a personal computer, and a peripheral device connected to the host. The peripheral device is preferably connected to the host via a USB connection. Means for determining a connection speed of the peripheral device can include a processor programmed to determine the connection speed of the peripheral device. Means for selecting a visual indicator corresponding to the connection speed can likewise be a processor programmed to select the visual indicator. The processor(s) can be part of the host, the USB device, or a separate cable or device. A visual display unit is preferably configured to display the selected visual indicator, and can include a computer monitor connected to the host or any other visual display device.

As discussed above, a method of visually representing a connection speed of a USB-connected device preferably includes determining a connection speed of a USB device connected to a host, selecting a graphic icon representative of the connection speed, and displaying the graphic icon. The graphic icon can be further selected to represent the USB device as well as the connection speed. The speed can, for example, be either low speed, full speed, or high speed. Displaying the graphic icon preferably comprises displaying the graphic icon on a display screen. The display screen can be configured to display a desktop of a computer operating system, a desktop window, a desktop tray of a computer operating system, or other desired image including the graphic icon.

While the principles of this invention have been shown and described with reference to preferred embodiments thereof, it will be understood by those skilled in the art that various changes in form and details may be made without departing from those principles. The invention should therefore be interpreted to encompass all such variations coming within the spirit and scope of the appended claims.

What is claimed is:

1. A method, implemented by a host computing system programmed to perform the following, comprising:
   determining a connection speed level of a device connected to the host computing system;
   selecting, using the determined connection speed level, a visual indicator from a plurality of visual indicators, the visual indicator comprising a first icon feature to visually indicate a type of the device and a second icon feature to visually indicate the determined connection speed level of the device; and
   displaying the visual indicator as a graphic icon on a display screen associated with the host computing system, wherein the second icon feature of the graphic icon is to visually distinguish the device having the connection speed level from a second device of the same type and with a second connection speed level.

2. The method according to claim 1, wherein the device is connected to the host computing system via a USB connection.

3. The method according to claim 2, wherein the connection speed level is one of a plurality of USB connection speeds.

4. The method according to claim 1, wherein the device is a USB-connected drive, and wherein the visual indicator graphically indicates a USB-connected drive type and the determined connection speed level of a USB connection between the host computing system and the USB-connected drive.

5. The method according to claim 4, wherein the graphic icon is displayed as a drive in a window view of an operating system of the host computing system.

6. The method according to claim 1, further comprising displaying a further graphic icon in a tray of an operating system of the host computing system, wherein the further graphic icon is representative of the determined connection speed level of the device.

7. A non-transitory storage medium storing software instructions that when executed by a processor of a host computing system cause the processor to perform a method, comprising:
 determining a connection speed level of a device connected to the host computing system;
 selecting, using the determined connection speed level, a visual indicator from a plurality of visual indicators, the visual indicator comprising a first icon feature to visually indicate a type of the device and a second icon feature to visually indicate the determined connection speed level of the device; and
 displaying the visual indicator as a graphic icon on a display screen associated with the host computing system, wherein the second icon feature of the graphic icon is to visually distinguish the device having the connection speed level from a second device of the same type and with a second connection speed level.

8. The storage medium of claim 7, wherein the device is connected to the host computing system via a USB connection.

9. The storage medium of claim 7, wherein the device is a USB-connected drive, and wherein the visual indicator graphically indicates a USB-connected drive type and the determined connection speed level of a USB connection between the host computing system and the USB-connected drive.

10. The storage medium of claim 9, wherein the graphic icon is displayed as a drive in a window view of an operating system of the host computing system.

11. A method of visually representing a speed of a USB-connected device, said method comprising:
 determining an enumerated speed of a USB device connected to a host computing device;
 selecting, using the determined enumerated speed of the USB device, a graphic icon from a plurality of graphical icons, the selected graphic icon comprising a first icon feature to visually indicate the determined enumerated speed and a second icon feature to visually indicate a type of the USB device; and
 displaying the selected graphic icon in a desktop window, wherein the second icon feature of the graphic icon is to visually distinguish the USB having the determined enumerated speed from a second USB device with a second enumerated speed.

12. The method according to claim 11, wherein the USB device is a USB-connected drive.

13. The method according to claim 11, wherein the enumerated speed is one of a plurality of USB connection speeds.

14. The method according to claim 11, wherein displaying the selected graphic icon comprises displaying the selected graphic icon on a display screen.

15. The method according to claim 14, wherein the selected graphic icon is displayed as a drive in a window view of an operating system of the host computing device.

16. The method according to claim 14, wherein the display screen is configured to display a further graphic icon in a desktop tray of an operating system of the host computing system, wherein the further graphic icon is representative of the determined enumerated speed.

* * * * *